(12) United States Patent
Dhiman et al.

(10) Patent No.: US 9,229,465 B2
(45) Date of Patent: Jan. 5, 2016

(54) CURRENT-STARVED INVERTER CIRCUIT

(71) Applicants: Kailash Dhiman, Ghaziabad (IN); Parul Sharma, Noida (IN); Divya Tripathi, Noida (IN)

(72) Inventors: Kailash Dhiman, Ghaziabad (IN); Parul Sharma, Noida (IN); Divya Tripathi, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 136 days.

(21) Appl. No.: 14/225,448

(22) Filed: Mar. 26, 2014

(65) Prior Publication Data

US 2015/0277462 A1    Oct. 1, 2015

(51) Int. Cl.
*H03K 5/12* (2006.01)
*G05F 1/595* (2006.01)

(52) U.S. Cl.
CPC ..................................... *G05F 1/595* (2013.01)

(58) Field of Classification Search
CPC ....................................................... G05F 1/595
USPC ............ 327/108, 170, 112, 306, 333; 326/82, 326/83, 86
See application file for complete search history.

(56) References Cited

U.S. PATENT DOCUMENTS

| 5,349,311 | A | 9/1994 | Mentzer |
| 5,656,960 | A * | 8/1997 | Holzer ............. H03K 19/00361 327/108 |
| 6,037,811 | A | 3/2000 | Ozguc |
| 6,188,415 | B1 * | 2/2001 | Silverbrook ......... B41J 2/17513 347/20 |
| 6,803,831 | B2 * | 10/2004 | Nishikido ............ H03K 3/0315 331/17 |
| 6,903,588 | B2 | 6/2005 | Vorenkamp |
| 7,667,514 | B2 * | 2/2010 | Yamazaki ............... H03K 5/133 326/87 |
| 8,130,016 | B2 | 3/2012 | Nagarajan |
| 8,390,355 | B2 | 3/2013 | Quan |
| 2012/0153909 | A1 * | 6/2012 | Bucossi .................. H02M 1/15 323/271 |

* cited by examiner

*Primary Examiner* — Dinh Le
(74) *Attorney, Agent, or Firm* — Charles Bergere

(57) ABSTRACT

A current-starved inverter circuit includes first and second current-mirror circuits, first and second transistors, a detector, and a current-booster. The first and second transistors receive a first source current and a first sink current from the first and second current-mirror circuits, respectively, and an input voltage signal, and generate an inverted input voltage signal (an output voltage signal). The detector generates a first detection signal when the output voltage signal exceeds a first threshold value and a second detection signal when the output voltage signal is less than a second threshold value. The current-booster, which is connected to the detector, receives the first and second detection signals and provides a second source current and a second sink current to the first and second transistors to pull-up and pull-down a voltage level of the output voltage signal, respectively.

11 Claims, 5 Drawing Sheets

CURRENT-STARVED INVERTER CIRCUIT

BACKGROUND OF THE INVENTION

The present invention relates generally to integrated circuits, and, more particularly, to a current-starved inverter circuit.

A current-starved inverter is an inverter circuit that receives an input voltage and generates an inverted input voltage with a constant slew rate. Current-starved inverter circuits are commonly used as pre-driver circuits to control the switching of transmitters such as those used in a USB 2.0 high speed differential driver circuit. The output of the current-starved inverter circuit is used to control the slew rate of the high speed differential driver circuit.

FIG. 1 shows a schematic circuit diagram of a conventional current-starved inverter circuit 100. The current-starved inverter circuit 100 includes first and second transistors 102 and 104 and first and second current-mirror circuits 106 and 108. The first current-mirror circuit 106 is connected to first and second supply voltages $V_{DD}$ and $V_{SS}$. In an example, the first supply voltage $V_{DD}$ is at 1.8 volts (V) and $V_{SS}$ is at ground level. The first current-mirror circuit 106 includes a first fixed-current source 110 and third and fourth transistors 112 and 114. The first fixed-current source 110 is connected to the second supply voltage $V_{SS}$ and generates a first reference current $I_{REF\_1}$. The third transistor 112 has a source terminal connected to the first supply voltage $V_{DD}$, a gate terminal connected to its drain terminal, and the drain terminal is connected to the first fixed-current source 110. Since the gate terminal of the third transistor 112 is connected to its drain terminal, the third transistor 112 operates in saturation region. The fourth transistor 114 has a source terminal connected to the first supply voltage $V_{DD}$, a gate terminal connected to the gate terminal of the third transistor 112, and a drain terminal connected to a source terminal of the first transistor 102. The fourth transistor 114 generates a first source current $I_{SOURCE\_1}$ based on the first reference current $I_{REF\_1}$. When the fourth transistor 114 operates in saturation region, the third and fourth transistors 112 and 114 form a current mirror causing the drain current of the third transistor 112, i.e., the first reference current $I_{REF\_1}$, to be mirrored to the fourth transistor 114. As a result, the first source current $I_{SOURCE\_1}$ that flows from the drain terminal of the fourth transistor 114 to the source terminal of the first transistor 102 is equal to the first reference current $I_{REF\_1}$. Since the first reference current $I_{REF\_1}$ is constant, the first source current $I_{SOURCE\_1}$ is constant.

The second current-mirror circuit 108 is connected to the first and second supply voltages $V_{DD}$ and $V_{SS}$ and includes a second fixed-current current source 116, and fifth and sixth transistors 118 and 120. The second current source 116 is connected to the first supply voltage $V_{DD}$ and generates a second reference current $I_{REF\_2}$. The fifth transistor 118 has a source terminal connected to the second supply voltage $V_{SS}$, a gate terminal connected to its drain terminal, and the drain terminal is connected to the second fixed-current source 116. Since the gate terminal of the fifth transistor 118 is connected to its drain terminal, the fifth transistor 118 operates in saturation region. The sixth transistor 120 has a source terminal connected to the second supply voltage $V_{SS}$, a gate terminal connected to the gate terminal of the fifth transistor 118, and a drain terminal connected to the source terminal of the second transistor 104. The sixth transistor 120 generates a first sink current $I_{SINK\_1}$ based on the second reference current $I_{REF\_2}$. When the sixth transistor 120 operates in the saturation region, the fifth and sixth transistors 118 and 120 form a current mirror causing the drain current of the fifth transistor 118, i.e., the second reference current $I_{REF\_2}$, to be mirrored to the sixth transistor 120. As a result, the first sink current $I_{SINK\_1}$ that flows from source terminal of the second transistor 104 to the drain terminal of the sixth transistor 120 is equal to the second reference current $I_{REF\_2}$. Since the second reference current $I_{REF\_2}$ is constant, the first sink current $I_{SINK\_1}$ is constant.

Gate terminals of the first and second transistors 102 and 104 receive the input voltage signal $V_{IN}$. When the input voltage signal $V_{IN}$ is at the first supply voltage $V_{DD}$ level, the first transistor 102 is switched off and the second transistor 104 is switched on. When the second transistor 104 is switched on, the first sink current $I_{SINK\_1}$ flows from the drain terminal of the second transistor 104 to its source terminal and pulls down the drain terminal of the second transistor 104 to the second supply voltage $V_{SS}$ level. Thus, the inverted input voltage signal (i.e., the output voltage signal) $V_{OUT\_P4}$, which is generated at the drain terminal of the second transistor 104, is at the second supply voltage $V_{SS}$ when the input signal is at the first supply voltage $V_{DD}$. When the input voltage signal $V_{IN}$ is at the second supply voltage $V_{SS}$, the first transistor 102 is switched on and the second transistor 104 is switched off. When the first transistor 102 is switched on, the first source current $I_{SOURCE\_1}$ flows from the source terminal of the first transistor 102 to its drain terminal and pulls up the drain terminal of the first transistor 102 to the first supply voltage $V_{DD}$ level. Thus, the output voltage signal $V_{OUT\_P4}$, which is generated at the drain terminal of the first transistor 102, is at the first supply voltage $V_{DD}$ when the input voltage signal $V_{IN}$ is at the second supply voltage $V_{SS}$.

FIG. 2 is a timing diagram that illustrates the input and output voltage signals $V_{IN}$ and $V_{OUT\_P4}$. At time T0, the input voltage signal $V_{IN}$ is at the second supply voltage $V_{SS}$ and the first source current $I_{SOURCE\_1}$ causes the output voltage signal $V_{OUT\_P4}$ to ramp up. The first source current $I_{SOURCE\_1}$ remains constant until the output voltage signal $V_{OUT\_P4}$ reaches a first threshold voltage level $V_{TH1}$ (e.g. 1.3 V) at time T1. After T1, when the output voltage signal $V_{OUT\_P4}$ exceeds the first threshold voltage level $V_{TH1}$, the difference in voltage levels at the source and gate terminals ($V_{SG}$) of the fourth transistor 114 and the source and drain terminals ($V_{SD}$) of the fourth transistor 114 is greater than a threshold voltage ($V_{TH}$). As a result, the fourth transistor 114 stops operating in the saturation region and starts operating in the linear region so the magnitude of the first source current $I_{SOURCE\_1}$ starts decreasing. Therefore, the time required for the output voltage signal $V_{OUT\_P4}$ to reach the first supply voltage $V_{DD}$ is impacted. The output voltage signal $V_{OUT\_P4}$ slowly reaches the first supply voltage $V_{DD}$ at time T2. At time T3, the input voltage signal $V_{IN}$ is at the first supply voltage $V_{DD}$, the first transistor 102 is switched off and the second transistor 104 is switched on. The first sink current $I_{SINK\_1}$ causes the output voltage signal $V_{OUT\_P4}$ to ramp down. The first sink current $I_{SINK\_1}$ remains constant until the output voltage signal $V_{OUT\_P4}$ reaches a second threshold voltage level $V_{TH2}$ (e.g., 0.75 V) at time T3.

After time T3, when the output voltage signal $V_{OUT\_P4}$ is less the second threshold voltage level $V_{TH2}$, the difference in voltage levels at the gate and source terminals ($V_{GS}$) of the sixth transistor 120 and the drain and source terminals ($V_{DS}$) of the sixth transistor 120 is greater than a threshold voltage ($V_{TH}$). As a result, the sixth transistor 120 stops operating in the saturation region and starts operating in the linear region so the magnitude of the first sink current $I_{SINK\_1}$ starts decreasing. Therefore, the time for the output voltage signal $V_{OUT\_P4}$ to reach the second supply voltage $V_{SS}$ increases.

The output voltage signal $V_{OUT\_PA}$ slowly reaches the second supply voltage $V_{SS}$ at time T4. Since the rise and fall times of the output voltage signal $V_{OUT\_PA}$ do not match the rise and fall times of the input voltage signal $V_{IN}$, the duty cycle of the output voltage signal $V_{OUT\_PA}$ does not match the duty cycle of the input voltage signal $V_{IN}$, thereby leading to duty cycle distortion. Further, if the frequency of the input voltage signal $V_{IN}$ is high, the output voltage signal $V_{OUT\_PA}$ will fail to reach the first supply voltage $V_{DD}$ when the input voltage signal $V_{IN}$ is at second supply voltage $V_{SS}$, and the second supply voltage $V_{SS}$ when the input voltage signal $V_{IN}$ is at first supply voltage $V_{DD}$. As a result, the conventional current-starved inverter circuit 100 introduces inter-symbol interference (ISI), which causes data-dependent jitter (DDJ) in the data transmit path of the HS differential driver circuit. DDJ can induce errors in the output data stream of the differential driver circuit. Therefore, the conventional current-starved inverter circuit 100 suffers from bandwidth limitations and the output voltage signal $V_{OUT\_PA}$ fails to provide a rail-to-rail voltage swing and a constant slew rate.

It would be advantageous to have a current-starved inverter circuit that generates an output voltage signal that has a constant slew rate and a rail-to-rail voltage swing.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
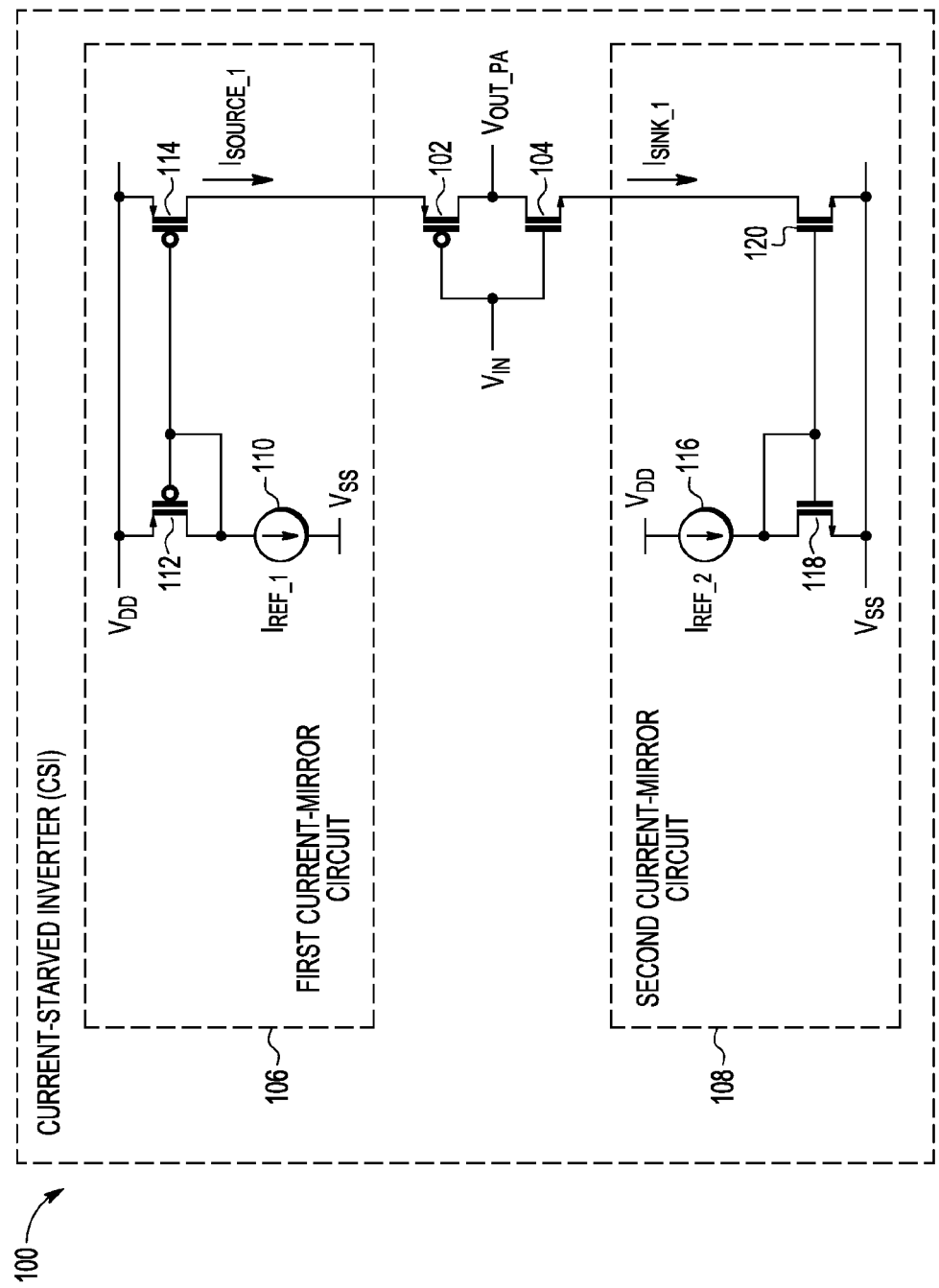
FIG. 1 is a schematic circuit diagram of a conventional current-starved inverter circuit.
Figure 2:
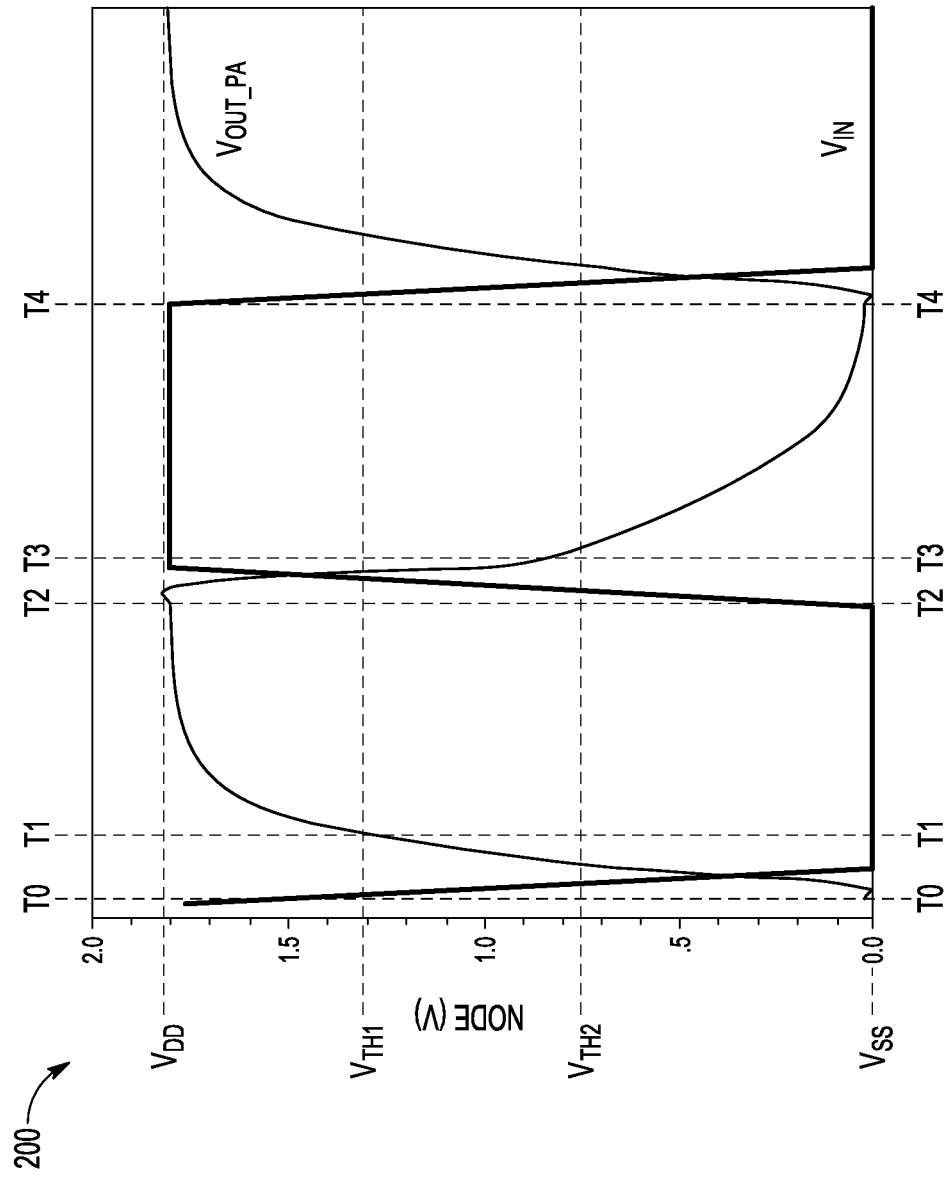
FIG. 2 is a timing diagram illustrating various voltage signals of the conventional current-starved inverter circuit of FIG. 1.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a current-starved inverter circuit for generating an inverted input voltage signal based on an input voltage signal is provided. The current-starved inverter circuit includes first and second transistors, first and second current-mirror circuits, a detector circuit, and a current-booster circuit. The first current-mirror circuit is connected to first and second supply voltages and generates a first source current. The first transistor has a source terminal connected to the first current-mirror circuit for receiving the first source current, a gate terminal for receiving the input voltage signal, and a drain terminal for outputting the inverted input voltage signal. The second current-mirror circuit is connected to the first and second supply voltages and generates a first sink current. The second transistor has a source terminal connected to the second current-mirror circuit for receiving the first sink current, a gate terminal for receiving the input voltage signal, and a drain terminal connected to the drain terminal of the first transistor for outputting the inverted input voltage signal. The detector circuit is connected to the drain terminals of the first and second transistors for receiving the inverted input voltage signal and generating a first detection signal when the inverted input voltage signal exceeds a first threshold voltage level and a second detection signal when the inverted input voltage signal is less than a second threshold voltage level. The current-booster circuit is connected to the detector circuit and the first and second transistors, for receiving the first and second detection signals, generating a second source current based on the first detection signal and a second sink current based on the second detection signal, providing the second source current to the source terminal of the first transistor, thereby pulling up a voltage level of the inverted input voltage signal to the voltage level of the first supply voltage, and providing the second sink current to the source terminal of the second transistor, thereby pulling down the voltage level of the inverted input voltage signal to the voltage level of the second supply voltage.

In another embodiment of the present invention, a current-starved inverter circuit for generating an inverted input voltage signal based on an input voltage signal is provided. The current-starved inverter circuit includes first through fourth transistors, first and second current-mirror circuits, and first and second inverters. The first current-mirror circuit is connected to first and second supply voltages and generates a first source current. The first transistor has a source terminal connected to the first current-mirror circuit for receiving the first source current, a gate terminal for receiving the input voltage signal, and a drain terminal for outputting the inverted input voltage signal. The second current-mirror circuit is connected to the first and second supply voltages and generates a first sink current. The second transistor has a source terminal connected to the second current-mirror circuit for receiving the first sink current, a gate terminal for receiving the input voltage signal, and a drain terminal connected to the drain terminal of the first transistor for outputting the inverted input voltage signal. The first inverter is connected to the drain terminals of the first and second transistors and has a first trip point equal to a first threshold voltage level. The first inverter receives the inverted input voltage signal and generates a first detection signal when the inverted input voltage signal exceeds the first trip point. The second inverter is connected to the drain terminal of the first and second transistors and has a second trip point equal to a second threshold voltage level. The second inverter receives the inverted input voltage signal and generates a second detection signal when the inverted input voltage signal is less than the second trip point. The third transistor has a source terminal connected to the first supply voltage, a gate terminal connected to the first inverter for receiving the first detection signal, and a drain terminal connected to the source terminal of the first transistor, for generating a second source current based on the first detection signal and providing the second source current to the source terminal of the first transistor, thereby pulling up a voltage level of the inverted input voltage signal to the voltage level of the first supply voltage. The fourth transistor has a source terminal connected to the second supply voltage, a gate terminal connected to the second inverter for receiving the second detection signal, and a drain terminal connected to the source terminal of the second transistor, for generating a second sink current based on the second detection signal and providing the second sink current to the source terminal of the second transistor, thereby pulling down the voltage level of the inverted input voltage signal to the voltage level of the second supply voltage.

In yet another embodiment of the present invention, a current-starved inverter circuit for generating an inverted input voltage signal based on an input voltage signal is provided. The current-starved inverter circuit comprises first through fourth transistors, first and second current-mirror circuits, and first and second comparator circuits. The first current-mirror circuit is connected to first and second supply voltages and generates a first source current. The first transistor has a source terminal connected to the first current-mirror circuit for receiving the first source current, a gate terminal for receiving the input voltage signal, and a drain terminal for outputting the inverted input voltage signal. The second current-mirror circuit is connected to the first and second supply voltages and generates a first sink current. The second transistor has a source terminal connected to the second current-mirror circuit for receiving the first sink current, a gate terminal for receiving the input voltage signal, and a drain terminal connected to the drain terminal of the first transistor for outputting the inverted input voltage signal. The first comparator circuit has a first terminal for receiving a first reference signal having the first threshold voltage level, a second terminal connected to the drain terminal of the first and second transistors for receiving the inverted input voltage signal, and an output terminal for generating a first detection signal when the inverted input voltage signal exceeds the first reference signal. The second comparator circuit has a first terminal for receiving a second reference signal having the second threshold voltage level, a second terminal connected to the drain terminal of the first and second transistors for receiving the inverted input voltage signal, and an output terminal for generating a second detection signal when the inverted input voltage signal is less than the second reference signal. The third transistor has a source terminal connected to the first supply voltage, a gate terminal connected to the output terminal of the first comparator circuit for receiving the first detection signal, and a drain terminal connected to the source terminal of the first transistor, for generating a second source current based on the first detection signal and providing the second source current to the source terminal of the first transistor, thereby pulling up a voltage level of the inverted input voltage signal to the voltage level of the first supply voltage. The fourth transistor has a source terminal connected to the second supply voltage, a gate terminal connected to the output terminal of the second comparator circuit for receiving the second detection signal, and a drain terminal connected to the source terminal of the second transistor, for generating a second sink current based on the second detection signal and providing the second sink current to the source terminal of the second transistor, thereby pulling down the voltage level of the inverted input voltage signal to the voltage level of the second supply voltage.

Various embodiments of the present invention provide a current-starved inverter circuit for generating an inverted input voltage signal based on an input voltage signal. The current-starved inverter circuit includes first and second transistors, first and second current-mirror circuits, a detector circuit, and a current-booster circuit. The first current-mirror circuit generates a first source current. The first transistor receives the first source current and the input voltage signal, and outputs the inverted input voltage signal. The second current-mirror circuit generates a first sink current. The second transistor receives the first sink current and the input voltage signal, and outputs the inverted input voltage signal. When the inverted input voltage signal exceeds a first threshold voltage level, the first source current starts decreasing and delays a voltage level of the inverted input voltage signal from reaching a voltage level of the first supply voltage. When the inverted input voltage signal is less than a second threshold voltage level, the first sink current starts decreasing and delays the voltage level of the inverted input voltage signal from reaching a voltage level of the second supply voltage. As a result, the rise and fall times of the inverted input voltage signal do not match. Further, when the input voltage signal is at a high frequency, the inverted input voltage signal fails to reach the voltage levels of the first and second supply voltages due to the delay and hence, does not provide a rail-to-rail voltage swing.

The detector circuit receives the inverted input voltage signal and generates a first detection signal when the inverted input voltage signal exceeds the first threshold voltage level and a second detection signal when the inverted input voltage signal is less than the second threshold voltage level. The current-booster circuit receives the first and second detection signals and generates a second source current and a second sink current. Thus, when the first source current decreases, the current-booster circuit provides the second source current to the first transistor and pulls up the voltage level of the inverted input voltage signal to the voltage level of the first supply voltage. When the first sink current decreases, the current-booster circuit provides the second sink current to the second transistor and pulls down the voltage level of the inverted input voltage signal to the voltage level of the second supply voltage. Thus, the current-starved inverter circuit generates the inverted input voltage signal that has a rail-to-rail voltage swing and matching rise and fall times, and hence a constant slew rate. Further, the current-starved inverter circuit does not require any capacitive elements, and hence, the characteristic of the inverted input voltage signal is independent of frequency and thus the current-starved inverter circuit is free of any bandwidth limitations. Thus, the current-starved inverter circuit prevents ISI and DDJ. Further, the absence of capacitive elements results in less area overheads.

Figure 3:
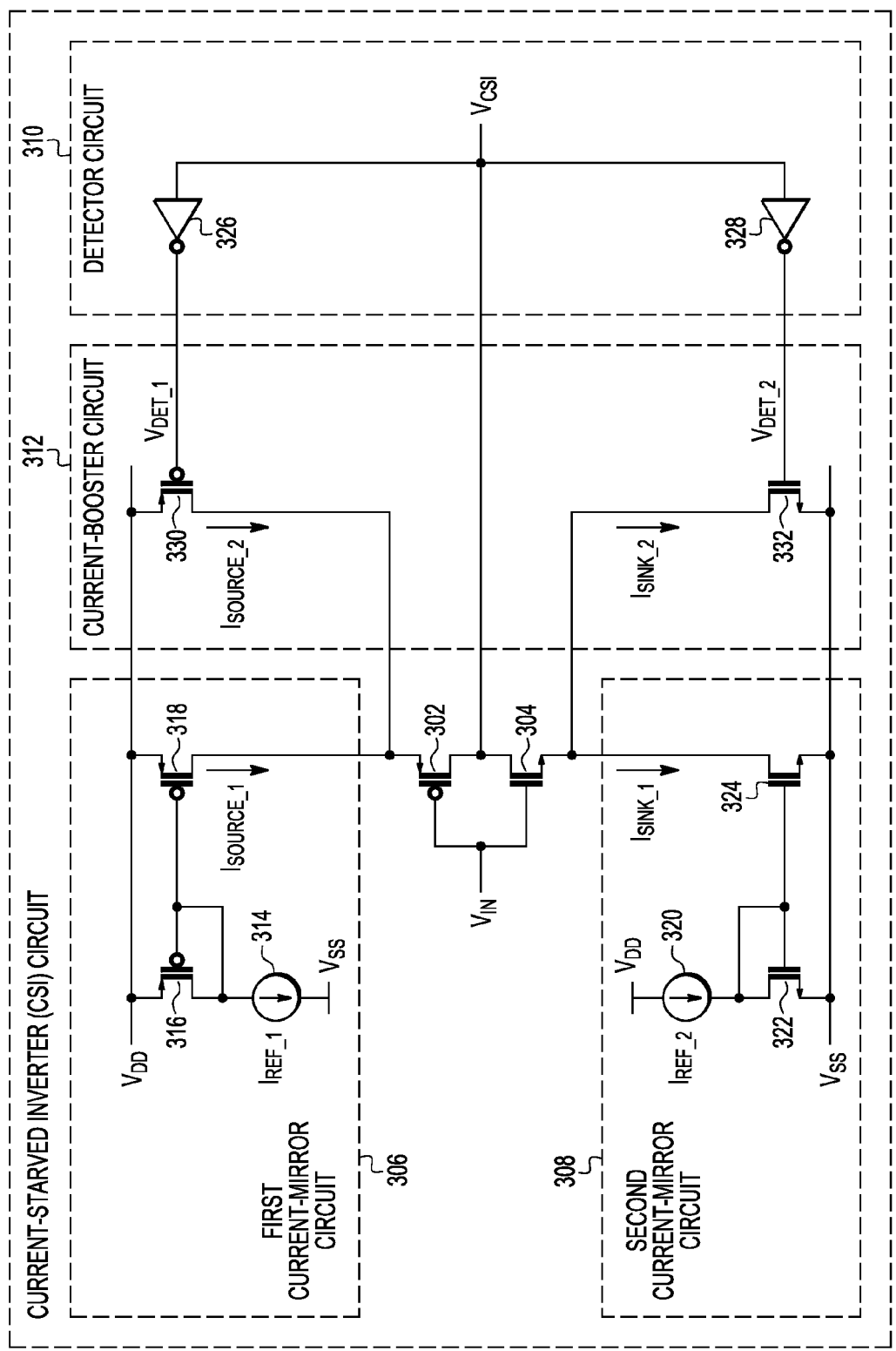
FIG. 3 is a schematic circuit diagram of a current-starved inverter circuit in accordance with an embodiment of the present invention.

Referring now to FIG. 3, a schematic circuit diagram of a current-starved inverter circuit 300 in accordance with an embodiment of the present invention is shown. The current-starved inverter circuit 300 includes first and second transistors 302 and 304, first and second current-mirror circuits 306 and 308, a detector circuit 310, and a current-booster circuit 312.

The first and second transistors 302 and 304 form an inverter circuit. The gate terminals of the first and second transistors 302 and 304 are connected together and receive an input voltage signal $V_{IN}$. Source terminals of the first and second transistors 302 and 304 are connected to the first and second current-mirror circuits 306 and 308 for receiving a first source current $I_{SOURCE\_1}$ and a first sink current $I_{SINK\_1}$, respectively. A drain terminal of the first transistor 302 is connected to a drain terminal of the second transistor 304. The drain terminals of the first and second transistors 302 and 304 output an inverted input voltage signal $V_{CSI}$ (i.e., an output voltage signal) based on the first source current $I_{SOURCE\_1}$ and the first sink current $I_{SINK\_1}$.

The first current-mirror circuit 306 includes a first fixed-current source 314, and fifth and sixth transistors 316 and 318. The first fixed-current source 314 is connected to a second supply voltage $V_{SS}$. The first fixed-current source 314 is a constant current supply that supplies a first reference current $I_{REF\_1}$, which is a constant current. The fifth transistor 316 has a source terminal connected to a first supply voltage $V_{DD}$, a gate terminal connected to its drain terminal, and the drain terminal is connected to the first fixed-current source 314. The first reference current $I_{REF\_1}$ flows as a drain current from the source terminal to the drain terminal of the fifth transistor 316. The sixth transistor 318 has a source terminal connected to the first supply voltage $V_{DD}$, and a gate terminal connected to the gate terminal of the fifth transistor 316. When the sixth transistor 318 operates in saturation region, the fifth and sixth transistors 316 and 318 form a current mirror causing the drain current of the fifth transistor 316, i.e., the first reference current $I_{REF\_1}$, to be mirrored as a drain current of the sixth transistor 318. As a result, the first source current $I_{SOURCE\_1}$ that flows from the source terminal of the sixth transistor 318 to the drain terminal of the sixth transistor 318 is equal to the first reference current $I_{REF\_1}$. The first source current $I_{SOURCE\_1}$ is constant when the sixth transistor 318 operates in saturation region. When the sixth transistor 318 operates in the linear region, the first source current $I_{SOURCE\_1}$ starts decreasing.

The second current-mirror circuit 308 includes a second fixed-current source 320, and seventh and eighth transistors 322 and 324. The second fixed-current source 320 is connected to the first supply voltage $V_{DD}$. The second fixed-current source 320 is a constant current supply that supplies a second reference current $I_{REF\_2}$, which is a constant current. The seventh transistor 322 has a source terminal connected to the second supply voltage $V_{SS}$, a gate terminal connected to its drain terminal, and the drain terminal is connected to the second fixed-current source 320. The second reference current $I_{REF\_2}$ flows as a drain current from the drain terminal to the source terminal of the seventh transistor 322. The eighth transistor 324 has a source terminal connected to the second supply voltage $V_{SS}$, and a gate terminal connected to the gate terminal of the seventh transistor 322. When the eighth transistor 324 operates in saturation region, the seventh and eighth transistors 322 and 324 form a current mirror causing the drain current of the seventh transistor 322, i.e., the second reference current $I_{REF\_2}$ to be mirrored as a drain current of the eighth transistor 324. As a result, the first sink current $I_{SINK\_1}$ that flows from the drain terminal of the eighth transistor 324 to the source terminal thereof is equal to the second reference current $I_{REF\_2}$. The first sink current $I_{SINK\_1}$ is constant when the eighth transistor 324 operates in saturation region. When the eighth transistor 324 operates in linear region, the first sink current $I_{SINK\_1}$ starts decreasing.

The detector circuit 310 includes first and second inverters 326 and 328. Input terminals of the first and second inverters 326 and 328 are connected to the drain terminals of the first and second transistors 302 and 304 for receiving the output voltage signal $V_{CSI}$. The first inverter 326 has a first trip point equal to a first threshold voltage level $V_{TH1}$. An output terminal of the first inverter 326 outputs a first detection signal $V_{DET\_1}$ based on the output voltage signal $V_{CSI}$. When the output voltage signal $V_{CSI}$ is less than the first trip point, the first detection signal $V_{DET\_1}$ output by the first inverter 326 is at a logic high state. When the output voltage signal $V_{CSI}$ exceeds the first trip point, the first detection signal $V_{DET\_1}$ output by the first inverter 326 is at a logic low state. The second inverter 328 has a second trip point equal to a second threshold voltage level $V_{TH2}$. An output terminal of the second inverter 328 outputs a second detection signal $V_{DET\_2}$ based on output voltage signal $V_{CSI}$. When output voltage signal $V_{CSI}$ is less than the second trip point, the second inverter 328 outputs the second detection signal $V_{DET\_2}$ at logic high state. When the output voltage signal $V_{CSI}$ exceeds the second trip point, the second inverter 328 outputs the second detection signal $V_{DET\_2}$ at logic low state.

The current-booster circuit 312 includes third and fourth transistors 330 and 332. Source terminals of the third and fourth transistors 330 and 332 are connected to the first and second supply voltages $V_{DD}$ and $V_{SS}$, respectively, gate terminals of the third and fourth transistors 330 and 332 are connected to the output terminals of the first and second inverters 326 and 328 for receiving the first and second detection signals $V_{DET\_1}$ and $V_{DET\_2}$, respectively, and drain terminals of the third and fourth transistors 330 and 332 are connected to the source terminals of the first and second transistors 302 and 304, respectively, for providing a second source current $I_{SOURCE\_2}$ and a second sink current $I_{SINK\_2}$ to the source terminals of the first and second transistors 302 and 304, respectively.

Figure 4:
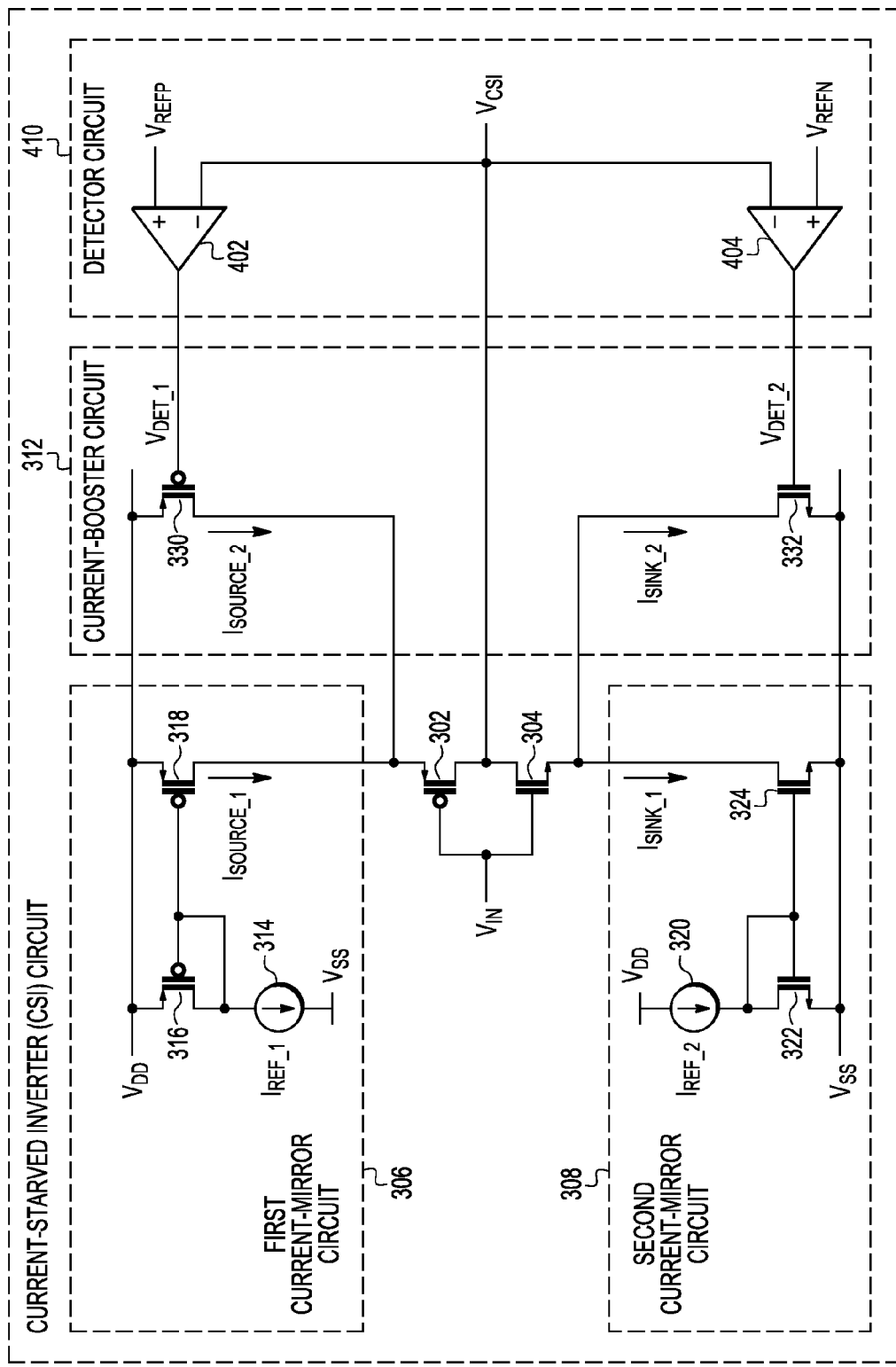
FIG. 4 is a schematic circuit diagram of a current-starved inverter circuit in accordance with another embodiment of the present invention.

In another embodiment of the present invention, the detector circuit 310 is replaced with a detector circuit 410. In the detector circuit 410, the first and second inverters 326 and 328 of the detector circuit 310 are replaced with first and second comparator circuits 402 and 404, as shown in FIG. 4. In such an embodiment, the first comparator 402 has a first terminal connected to a first bandgap voltage generator (not shown) for receiving a first reference signal $V_{REFP}$ having the first threshold voltage level $V_{TH1}$, and a second terminal connected to the drain terminals of the first and second transistors 302 and 304 for receiving output voltage signal $V_{CSI}$. An output terminal of the first comparator circuit 402 outputs the first detection signal $V_{DET\_1}$. The second comparator circuit 404 has a first terminal connected to a second bandgap voltage generator (not shown) for receiving a second reference signal $V_{REFN}$ having the second threshold voltage level $V_{TH2}$, and a second terminal connected to the drain terminals of the first and second transistors 302 and 304 for receiving output voltage signal $V_{CSI}$. An output terminal of the second comparator circuit 404 outputs the second detection signal $V_{DET\_2}$. The first input terminals of the first and second comparator circuits 402 and 404 are non-inverting terminals and the second terminals of the first and second comparator circuits 402 and 404 are inverting terminals. The gate terminals of the third and fourth transistors 330 and 332 of the current-booster circuit 312 are connected to the output terminals of the first and second comparator circuits 402 and 404, for receiving the first and second detection signals $V_{DET\_1}$ and $V_{DET\_2}$, respectively. When the output voltage signal $V_{CSI}$ is less than the first threshold voltage level $V_{TH1}$, the first comparator circuit 402 outputs the first detection signal $V_{DET\_1}$ at a logic high state. When the output voltage signal $V_{CSI}$ exceeds the first threshold voltage level $V_{TH1}$, the first comparator circuit 402 outputs the first detection signal $V_{DET\_2}$ at logic low state. When the output voltage signal $V_{CSI}$ is less than the second threshold voltage level $V_{TH2}$, the second comparator circuit 404 outputs the second detection signal $V_{DET\_2}$ at a logic high state. When the output voltage signal $V_{CSI}$ exceeds the second threshold voltage level $V_{TH2}$, the second comparator circuit 404 outputs the second detection signal $V_{DET\_2}$ at logic low state.

Figure 5:
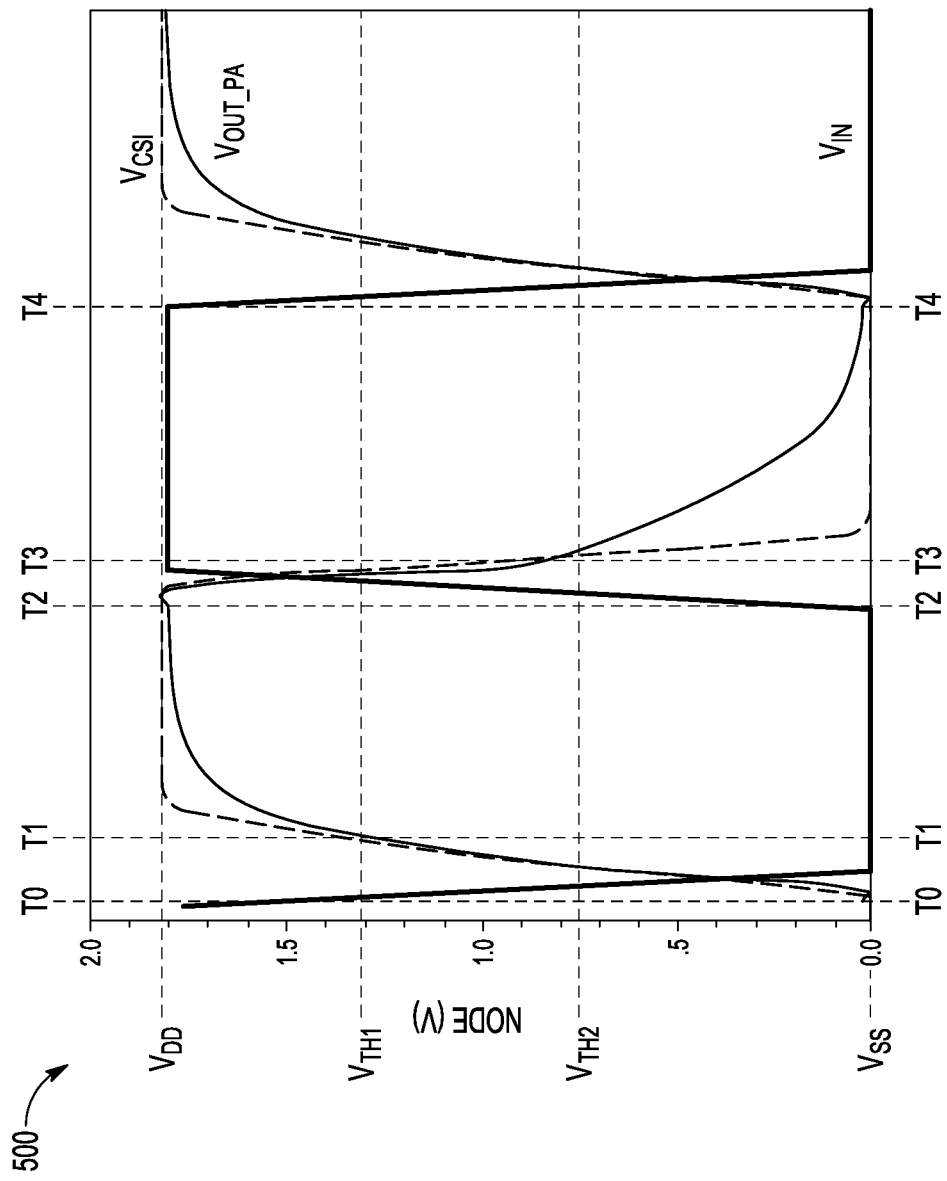
FIG. 5 is a timing diagram illustrating various voltage signals of the current-starved inverter circuits of FIGS. 3 and 4.

Referring now to FIG. 5, a timing diagram illustrating the input voltage signal $V_{IN}$, and a comparison of the output voltage signal $V_{CSI}$ with the output voltage signal $V_{OUT\_PA}$ is shown.

In operation, at time T0, the input voltage signal $V_{IN}$ switches from logic high (i.e. the first supply voltage $V_{DD}$) to logic low (i.e. the second supply voltage $V_{SS}$). Since the gate terminals of the first and second transistors 302 and 304 receive the input voltage signal $V_{IN}$ at a logic low state, the first and second transistors 302 and 304 are switched on and off, respectively. The source terminal of the first transistor 302 receives the first source current $I_{SOURCE\_1}$ from the drain terminal of the sixth transistor 318. Since the first transistor 302 is on, the first transistor 302 starts conducting and the first source current $I_{SOURCE\_1}$ flows from the source terminal of the first transistor 302 to its drain terminal. Thus, the drain terminal of the first transistor 302 is pulled up by the first source current $I_{SOURCE\_1}$ and the voltage level of output voltage signal $V_{CSI}$ generated at the drain terminal of the first transistor 302 starts increasing. The voltage level of output voltage signal $V_{CSI}$ increases linearly with a constant slew rate until time T1. At time T1, when the voltage level of the output voltage signal $V_{CSI}$ reaches the first threshold voltage level $V_{TH1}$, the sixth transistor 318 stops operating in the saturation region and instead operates in the linear region. As a result, the first source current $I_{SOURCE\_1}$ begins decreasing and the slew rate of output voltage signal $V_{CSI}$ increases.

After time T1, when the output voltage signal $V_{CSI}$ exceeds the first threshold voltage level $V_{TH1}$, the first inverter 326 generates a logic low first detection signal $V_{DET\_1}$. For the current-starved inverter circuit 400, after time T1, when the output voltage signal $V_{CSI}$ exceeds the first threshold voltage level $V_{TH1}$, the first comparator circuit 402 generates a logic low first detection signal $V_{DET\_1}$. The gate terminal of the third transistor 330 receives the first detection signal $V_{DET\_1}$. Since the first detection signal $V_{DET\_1}$ is low, the third transistor 330 is switched on and the second source current $I_{SOURCE\_2}$ flows from the source to drain terminal of the third transistor 330. Since the drain terminal of the third transistor 330 is connected to the source terminal of the first transistor 302 and the first transistor 302 is on, the drain terminal of the first transistor 302 receives the second source current $I_{SOURCE\_2}$ and is pulled up to the first supply voltage $V_{DD}$. Thus, the second source current $I_{SOURCE\_2}$ compensates for the decrease in the first source current $I_{SOURCE\_1}$ and prevents an increase in the slew rate of output voltage signal $V_{CSI}$.

At time T2, the input voltage signal $V_{IN}$ switches from low to high. Since the gate terminals of the first and second transistors 302 and 304 receive the input voltage signal $V_{IN}$ at a logic high state, the first and second transistors 302 and 304 are switched off and on, respectively. The first sink current $I_{SINK\_1}$ flows from the drain terminal of the eighth transistor 324 to the source terminal of the eighth transistor 324. Since the source terminal of the second transistor 304 is connected to the drain terminal of the eighth transistor 324, the first sink current $I_{SINK\_1}$ flows from the drain terminal of the second transistor 304 to the source terminal of the second transistor 304. Thus, the drain terminal of the second transistor 304 is pulled down by the first sink current $I_{SINK\_1}$ and the voltage level of output voltage signal $V_{CSI}$ generated at the drain terminal of the second transistor 304 starts decreasing. The voltage level of output voltage signal $V_{CSI}$ decreases linearly with a constant slew rate until time T3. At time T3, when the voltage level of output voltage signal $V_{CSI}$ reaches the second threshold voltage level $V_{TH2}$, the eighth transistor 324 stops operating in the saturation region and starts operating in the linear region. As a result, the first sink current $I_{SINK\_1}$ starts decreasing and the slew rate of output voltage signal $V_{CSI}$ increases.

After time T3, when output voltage signal $V_{CSI}$ is less than the first threshold voltage level $V_{TH1}$, the second inverter 328 generates a logic high second detection signal $V_{DET\_2}$. For the current-starved inverter circuit 400, after time T3, when output voltage signal $V_{CSI}$ is less than the second threshold voltage level $V_{TH2}$, the second comparator circuit 404 generates a logic high second detection signal $V_{DET\_2}$. The gate terminal of the fourth transistor 332 receives the second detection signal $V_{DET\_2}$. Since the second detection signal $V_{DET\_2}$ is high, the fourth transistor 332 is switched on and the second sink current $I_{SINK\_2}$ flows from the drain terminal of the fourth transistor 332 to its source terminal. Since the drain terminal of the fourth transistor 332 is connected to the source terminal of the second transistor 304 and the second transistor 304 is on, the drain terminal of the second transistor 304 receives the second sink current $I_{SINK\_2}$ and is pulled down to the second supply voltage $V_{SS}$. Thus, the second sink current $I_{SINK\_2}$ compensates for the decreasing first sink current $I_{SINK\_1}$ and prevents the increase in the slew rate of output voltage signal $V_{CSI}$.

Thus, when the output voltage signal $V_{CSI}$ exceeds the first threshold voltage level $V_{TH1}$, the second source current $I_{SOURCE\_2}$ pulls up the drain terminal of the first transistor 302 to the first supply voltage $V_{DD}$ and when output voltage signal $V_{CSI}$ is less than the second threshold voltage level $V_{TH2}$, the second sink current $I_{SINK\_2}$ pulls down the drain terminal of the second transistor 304 to the second supply voltage $V_{SS}$. As a result, the delay in reaching the rail voltages of $V_{DD}$ and $V_{SS}$ is prevented and a constant slew rate of output voltage signal $V_{CSI}$ is maintained. Further, due to the absence of any capacitive circuits in the current-starved inverter circuits 300 and 400, the current-starved inverter circuits 300 and 400 are free of any bandwidth limitations. Thus, the current-starved inverter circuits 300 and 400 provide a rail-to-rail voltage swing for high frequency input voltage signals $V_{IN}$ and prevents ISI and DDJ.

In an embodiment of the present invention, the first, third, fifth, and sixth transistors (302, 330, 316, and 318) are p-channel metal-oxide semiconductor (PMOS) transistors, and the second, fourth, seventh, and eighth transistors (304, 332, 322, and 324) are n-channel metal-oxide semiconductor (NMOS) transistors.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A current-starved inverter circuit for generating an output voltage signal based on an input voltage signal, the current-starved inverter circuit comprising:

a first current-mirror circuit, connected to first and second supply voltages, for generating a first source current;

a second current-mirror circuit, connected to the first and second supply voltages, for generating a first sink current;

a first transistor having a source terminal connected to the first current-mirror circuit for receiving the first source current, a gate terminal for receiving the input voltage signal, and a drain terminal for outputting the output voltage signal;

a second transistor having a source terminal connected to the second current-mirror circuit for receiving the first sink current, a gate terminal for receiving the input voltage signal, and a drain terminal connected to the drain terminal of the first transistor for outputting the output voltage signal;

a detector circuit, connected to the drain terminals of the first and second transistors, for receiving the output voltage signal and generating a first detection signal when the output voltage signal exceeds a first threshold voltage level and a second detection signal when the output voltage signal is less than a second threshold voltage level; and a current-booster circuit, connected to the detector circuit and the first and second transistors, for receiving the first and second detection signals, generating a second source current based on the first detection signal and a second sink current based on the second detection signal, providing the second source current to the source terminal of the first transistor, thereby pulling up a voltage level of the output voltage signal to the voltage level of the first supply voltage, and providing the second sink current to the source terminal of the second transistor, thereby pulling down the voltage level of the output voltage signal to the voltage level of the second supply voltage.

2. The current-starved inverter circuit of claim 1, wherein the current-booster circuit comprises:

a third transistor having a source terminal connected to the first supply voltage, a gate terminal connected to the detector circuit for receiving the first detection signal, and a drain terminal connected to the source terminal of the first transistor for generating the second source current based on the first detection signal; and a fourth transistor having a source terminal connected to the second supply voltage, a gate terminal connected to the detector circuit for receiving the second detection signal, and a drain terminal connected to the source terminal of the second transistor for generating the second sink current based on the second detection signal.

3. The current-starved inverter circuit of claim 2, wherein the detector circuit comprises:

a first inverter having an input connected to the drain terminals of the first and second transistors for receiving the output voltage signal, and having a first trip point equal to the first threshold voltage level, and an output for generating the first detection signal; and a second inverter having an input connected to the drain terminals of the first and second transistors for receiving the output voltage signal, and having a second trip point equal to the second threshold voltage level, and an output for generating the second detection signal.

4. The current-starved inverter circuit of claim 2, wherein the first current-mirror circuit comprises:

a first fixed-current source, connected to the second supply voltage, for generating a first reference current;

a fifth transistor having a source terminal connected to the first supply voltage, a drain terminal connected to the first fixed-current source, and a gate terminal connected to the drain terminal thereof; and a sixth transistor having a source terminal connected to the first supply voltage, a gate terminal connected to the gate terminal of the fifth transistor, and a drain terminal connected to the source terminal of the first transistor for generating the first source current based on the first reference current.

5. The current-starved inverter circuit of claim 4, wherein the second current-mirror circuit comprises:

a second fixed-current source, connected to the first supply voltage, for generating a second reference current;

a seventh transistor having a source terminal connected to the second supply voltage, a drain terminal connected to the second fixed-current source, and a gate terminal connected to the drain terminal thereof; and an eighth transistor having a source terminal connected to the second supply voltage, a gate terminal connected to the gate terminal of the seventh transistor, and a drain terminal connected to the source terminal of the second transistor for generating the first sink current based on the second reference current.

6. The current-starved inverter circuit of claim 5, wherein the first, third, fifth, and sixth transistors are p-channel metal-oxide semiconductor (PMOS) transistors.

7. The current-starved inverter circuit of claim 6, wherein the second, fourth, seventh, and eighth transistors are n-channel metal-oxide semiconductor (NMOS) transistors.

8. A current-starved inverter circuit, for generating an output voltage signal based on an input voltage signal, the current-starved inverter circuit comprising:

a first current-mirror circuit, connected to first and second supply voltages, for generating a first source current;

a second current-mirror circuit, connected to the first and second supply voltages, for generating a first sink current;

a first transistor having a source terminal connected to the first current-mirror circuit for receiving the first source current, a gate terminal for receiving the input voltage signal, and a drain terminal for providing the output voltage signal;

a second transistor having a source terminal connected to the second current-mirror circuit for receiving the first sink current, a gate terminal for receiving the input voltage signal, and a drain terminal connected to the drain terminal of the first transistor for providing the output voltage signal;

a first inverter, connected to the drain terminals of the first and second transistors and having a first trip point equal to a first threshold voltage level, for receiving the output voltage signal, and generating a first detection signal when the output voltage signal exceeds the first trip point;

a second inverter, connected to the drain terminals of the first and second transistors and having a second trip point equal to a second threshold voltage level, for receiving the output voltage signal, and generating a second detection signal when the output voltage signal is less than the second trip point;

a third transistor having a source terminal connected to the first supply voltage, a gate terminal connected to the first inverter for receiving the first detection signal, and a drain terminal connected to the source terminal of the first transistor for generating a second source current based on the first detection signal and providing the second source current to the source terminal of the first transistor, thereby pulling up a voltage level of the output voltage signal to the voltage level of the first supply voltage; and a fourth transistor having a source terminal connected to the second supply voltage, a gate terminal connected to the second inverter for receiving the second detection signal, and a drain terminal connected to the source terminal of the second transistor for generating a second sink current based on the second detection signal and providing the second sink current to the source terminal of the second transistor, thereby pulling down the voltage level of the output voltage signal to the voltage level of the second supply voltage.

9. The current-starved inverter circuit of claim 8, wherein the first current-mirror circuit comprises:

a first fixed-current source, connected to the second supply voltage for generating a first reference current;

a fifth transistor having a source terminal connected to the first supply voltage, a drain terminal connected to the first fixed-current source, and a gate terminal connected to the drain terminal thereof; and a sixth transistor having a source terminal connected to the first supply voltage, a gate terminal connected to the gate terminal of the fifth transistor, and a drain terminal connected to the source terminal of the first transistor for generating the first source current based on the first reference current.

10. The current-starved inverter circuit of claim 9, wherein the second current-mirror circuit comprises:

a second fixed-current source, connected to the first supply voltage, for generating a second reference current;

a seventh transistor having a source terminal connected to the second supply voltage, a drain terminal connected to the second fixed-current source, and a gate terminal connected to the drain terminal thereof; and an eighth transistor having a source terminal connected to the second supply voltage, a gate terminal connected to the gate terminal of the seventh transistor, and a drain terminal connected to the source terminal of the second transistor for generating the first sink current based on the second reference current.

11. The current-starved inverter circuit of claim 10, wherein the first, third, fifth and sixth transistors are p-channel metal oxide semiconductor (PMOS) transistors, and the second, fourth, seventh and eighth transistors are n-channel metal oxide semiconductor (NMOS) transistors.

* * * * *